United States Patent
Greene, Jr. et al.

(10) Patent No.: US 9,546,348 B2
(45) Date of Patent: Jan. 17, 2017

(54) CONICAL BREWING DEVICE WITH NESTING SUPPORTING MEMBER

(71) Applicant: Demon Brewing Company, Inc., Casa Grande, AZ (US)

(72) Inventors: William James Greene, Jr., La Canada, CA (US); Sam Dramis, Casa Grande, AZ (US)

(73) Assignee: Demon Brewing Company, Inc., Casa Grande, AZ (US)

( * ) Notice: Subject to any disclaimer, the term of this patent is extended or adjusted under 35 U.S.C. 154(b) by 262 days.

(21) Appl. No.: 14/088,776

(22) Filed: Nov. 25, 2013

(65) Prior Publication Data

US 2014/0144328 A1  May 29, 2014

Related U.S. Application Data

(60) Provisional application No. 61/730,705, filed on Nov. 28, 2012.

(51) Int. Cl.
  *C12C 13/10*  (2006.01)
(52) U.S. Cl.
  CPC ..................................... *C12C 13/10* (2013.01)
(58) Field of Classification Search
  CPC .................................................... C12C 13/10
  USPC .............. 99/276, 277.1, 277.2, 278; 220/320
  See application file for complete search history.

(56) References Cited

U.S. PATENT DOCUMENTS

| | | | |
|---|---|---|---|
| 6,222,168 B1* | 4/2001 | Witonsky | A61J 9/02 116/216 |
| 6,490,965 B1* | 12/2002 | Moreland | C12C 13/10 426/11 |
| 6,915,993 B2* | 7/2005 | O'Leary | A47B 91/06 248/188.8 |
| 2009/0193978 A1* | 8/2009 | Blichmann | B65D 45/32 99/276 |
| 2010/0129490 A1 | 5/2010 | Williams et al. | |
| 2013/0202736 A1* | 8/2013 | Reeves | C12C 13/00 426/11 |

OTHER PUBLICATIONS

Ultimate Conical Fermenter—(www.homebrewing.com/conical-fermenters.php)—p. 3 Published Nov. 27, 2012.*

(Continued)

*Primary Examiner* — David Angwin
*Assistant Examiner* — Justin Dodson
(74) *Attorney, Agent, or Firm* — Woodard Emhardt Moriarty McNett & Henry

(57) ABSTRACT

Brewing assemblies and kits are generally disclosed herein. In particular, a brewing assembly comprising an upper member having a generally conical lower portion and a base member having a funnel shaped portion wherein the lower portion of the upper member is arranged to nest with the funnel shaped portion of the base member is disclosed. The present disclosure also describes brewing kits comprising a fermenter, a lid arranged to close a top opening of the fermenter, a tap connectable to a tap opening of the fermenter, and a base member having a substantially continuous and generally conical portion arranged to mate with a generally conical lower portion of the fermenter. Other embodiments are disclosed.

15 Claims, 3 Drawing Sheets

(56) References Cited

OTHER PUBLICATIONS

Blichmann Fermentor—http://www.blichmannengineering.com/fermentor/fermentor.html; Printout dated Nov. 27, 2012.
Hobby Beverage Equipment Co., 6.5 Gallon Conical Fermenter and 40 Gallon Conical Fermenter, http://www.minibrew.com; Printout dated Nov. 27, 2012.

* cited by examiner

CONICAL BREWING DEVICE WITH NESTING SUPPORTING MEMBER

CROSS-REFERENCE TO RELATED APPLICATION

This application claims the benefit of US Provisional Application No. 61/730,705, filed Nov. 28, 2012, which is hereby incorporated by reference.

FIELD OF THE INVENTION

The present disclosure pertains generally to apparatus for fermentation.

BACKGROUND

In brewing beer, a fermentation process is used to convert sugars contained in a liquid mixture, called wort, into alcohol and carbon dioxide gas. Generally, prior to the fermentation process, it is desirable that the fermentation container be free of any undesirable contaminants, such as a foreign yeast, that may alter the desired fermentation process. Similarly, during the fermentation process, it is desirable that the inside of the fermentation container is sealed off from outside air, so as to prevent the introduction of stray yeast. Some fermentation containers, however, have vents arranged to allow for carbon dioxide generated during the fermentation process to be released from the container.

In recent years, hobby brewing, sometimes referred to as "homebrewing," has become increasingly popular. Unlike commercial brewers, homebrewers typically produce smaller sized batches of beer. In many homebrewing kits, fermentation takes place in a container known as a carboy which has a flat bottom and a narrow neck leading to an opening at the top. During the fermentation process, a sediment referred to as "trub" that comprises proteins and inactive yeast forms on the bottom of the fermentation container containing beer. Unfortunately, it can be difficult to remove the beer from the carboy after the fermentation process without mixing the trub into the beer. Oftentimes, homebrewers use a siphon tube to transfer the beer from the carboy into another container; however, this method usually results in a quantity of beer being left in the carboy. Thus, alternative brewing assemblies are desired.

SUMMARY

In some aspects, the present disclosure describes brewing assemblies and brewing kits. In accordance with some embodiments, an upper member defining a fluid cavity and a base member arranged to support the upper member are arranged to nest and/or mate with one another. In some arrangements, the present disclosure describes a brewing assembly comprising an upper member having a generally cylindrical upper portion and a generally conical lower portion; a base member having an upper generally circular part with a generally cylindrical upper portion and a generally funnel shaped lower portion sized so that the upper member can nest with 1) the lower part of its generally cylindrical upper portion adjacent the upper generally cylindrical part of the base member and 2) the upper part of the generally conical lower portion of the upper member adjacent the generally funnel shaped lower portion; a lid positioned to close the top of the upper member; and a tap in the generally conical lower portion of the upper member. In some instances, the base member additionally comprises three legs, and, in some embodiments, the base member is made of plastic having three openings into which the three legs are inserted.

Generally, several embodiments of the present disclosure describe brewing assemblies in which the upper member is free of any attachment mechanism other than gravity to hold it in place on the base member, and in which the upper member can be lifted from the base member with the tap remaining attached to the generally conical lower portion without using tools.

The present disclosure also describes a brewing assembly comprising an upper member having a generally cylindrical upper portion and a generally conical lower portion and defining a cavity for receiving a fluid, the generally cylindrical upper portion having a top opening, and the generally conical lower portion having a opening arranged to connect to a tap; a base member having a substantially continuous and generally conical portion arranged to mate with the generally conical lower portion of the upper member; a lid arranged to close the top opening of the upper member; and a tap connectable to the port. Similar to embodiments described elsewhere herein, the brewing assembly can also comprise a plurality of legs, wherein the base member defines openings sized and arranged to slidably receive the plurality of legs.

Also disclosed are brewing kits comprising a package containing a fermenter defining a cavity for receiving a fluid, the fermenter having a top opening and a generally conical lower portion, the generally conical lower portion having a tap opening; a lid arranged to close the top opening of the fermenter; a tap connectable to the tap opening of the fermenter; and a base member having a substantially continuous and generally conical portion arranged to mate with the generally conical lower portion of the fermenter. Kits preferably include an external thermometer that senses temperature on an outer surface of the fermenter, whereby no opening in the fermenter is needed for the thermometer; the external thermometer contained within the package. Additionally or alternatively, the fermenter of the kits can have a volumetric capacity of less than about 10 gallons and/or be made of a transparent material. In some arrangements, brewing kits include ingredients for brewing beer contained within the package, bottles and caps contained within the package, and/or a bottle filler contained within the package.

In many arrangements, the base member is injection molded plastic and the upper and lower portions of the upper member are a unitary blow molded plastic piece. Additionally or alternatively, the brewing assembly or brewing kit includes a stick-on thermometer placed on the outside of the upper member and/or an airlock connecting to the upper member.

Further forms, objects, features, aspects, benefits, advantages, and embodiments of the present invention will become apparent from a detailed description and drawings provided herewith.

DESCRIPTION OF THE ILLUSTRATED EMBODIMENTS

Figure 1:
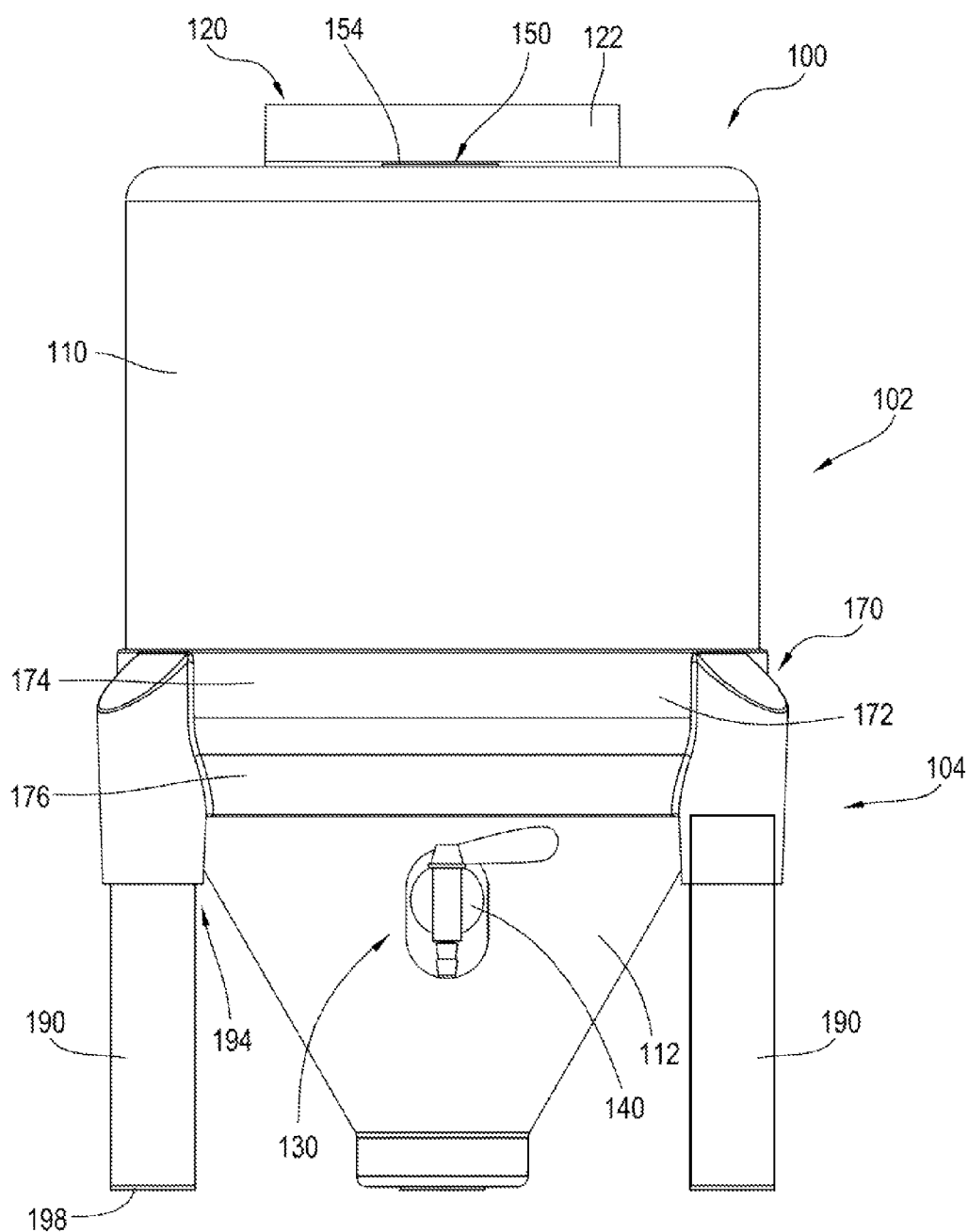
FIG. 1 is a front elevation view of a brewing assembly.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With respect to the specification and claims, it should be noted that the singular forms "a", "an", "the", and the like include plural referents unless expressly discussed otherwise. As an illustration, references to "a device" or "the device" include one or more of such devices and equivalents thereof.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "200" series reference numeral will likely first appear in FIG. 2, and so on.

For simplicity and ease of understanding, the following embodiments will be discussed with reference to brewing assemblies for brewing beer; however, it is not intended that the present disclosure be limited to such. The embodiments described in the present disclosure may also be used in other brewing and fermentation processes. For example, the present invention may be used in wine fermentation, just to name one non-limiting example.

Figure 2:
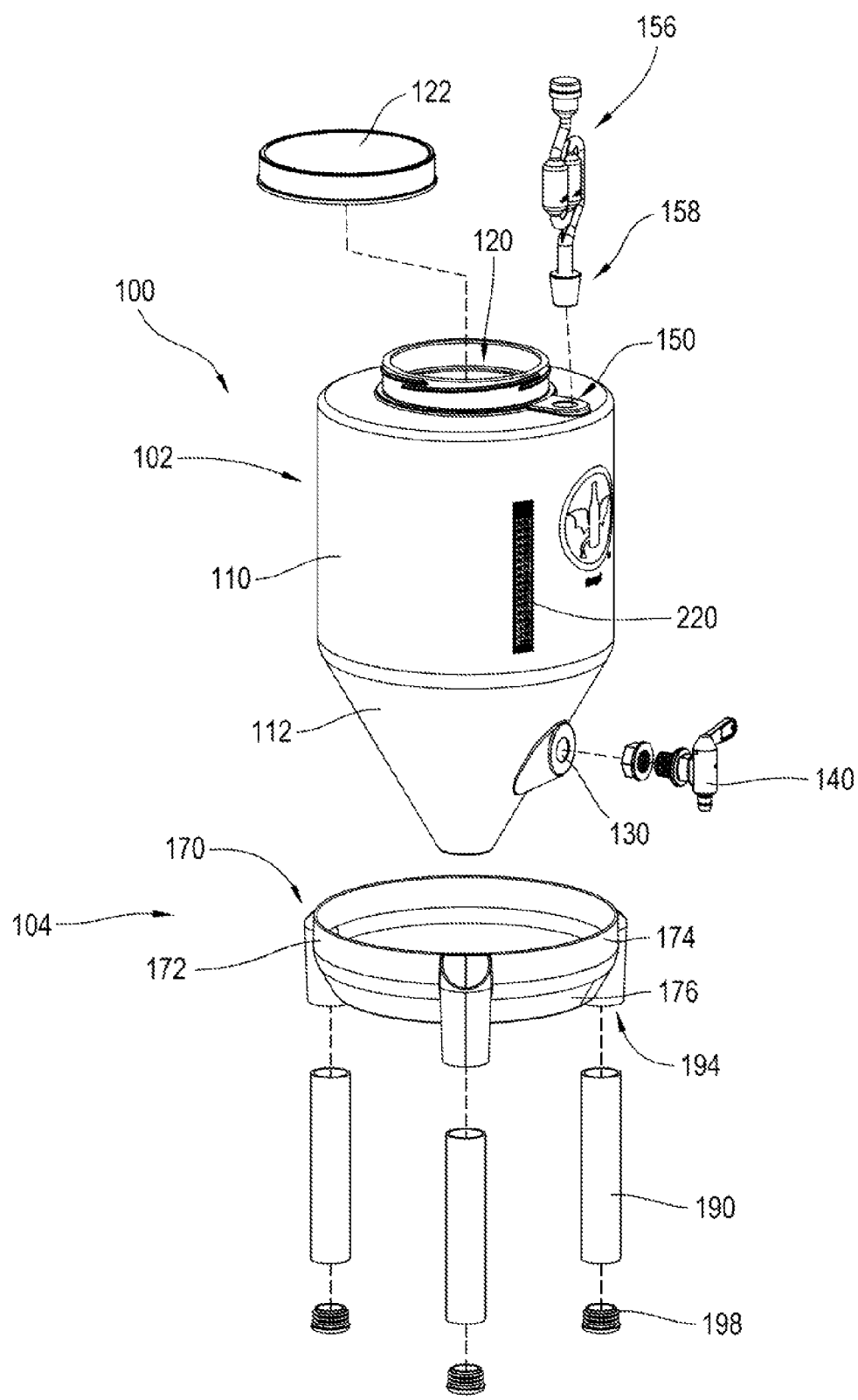
FIG. 2 is an exploded view of the brewing assembly of FIG. 1 with a double bubble airlock added.

FIG. 1 illustrates a front elevation view of a brewing assembly 100. Brewing assembly 100 comprises an upper member 102 such as a conical fermenter and a base member 104 such as a stand assembly. Upper member 102, such as fermenter, has a generally cylindrical upper portion 110 and a generally conical lower portion 112. Upper portion 110 and lower portion 112 define a cavity arranged to receive a fluid. For example, upper portion 110 and lower portion 112 may define a cavity having a volume of less than 10 gallons. More particularly, in some instances upper portion 110 and lower portion 112 define a cavity having a volume of approximately 3 gallons which when used in beer fermentation can produce approximately 2 gallons of beer. Additionally or alternatively, portions of upper member 102 are arranged so as to allow for the visualization of the contents of the upper member 102. For example, upper portion 110 and lower portion 112 can comprise a substantially transparent plastic.

Upper portion 110 of upper member 102 has a top opening 120 arranged to allow fluid communication with the cavity defined by upper portion 110 and lower portion 112. Brewing assembly 100 includes a lid 122 positioned and/or arranged to close top opening 120 of upper portion 110. For instance, lid 122 may threaded onto to upper portion 110 so as to cover top opening 120.

Lower portion 112 has a tap opening 130 arranged to allow fluid communication with the cavity defined by upper portion 110 and lower portion 112. In some instances, tap opening 130 is positioned about half-way down the side of lower portion 112. A tap 140 suitable for regulating the flow of a fluid into and/or out of the cavity of upper member 102, such as a fermenter, is arranged to connect to and/or is connected to tap opening 130. Preferably, the section of lower portion 112 defining opening 130 is free from a seam or a part line so as to reduce the likelihood of a fluid leak around or near opening 130.

As will be appreciated by those of ordinary skill the art, tap 140 may comprise any suitable device by which the flow of liquid from upper member 102 can be controlled. For example, tap 140 may comprise a valve or stopcock or spigot, just to name a few non-limiting examples. Similarly, tap 140 may be connected to upper member 102 by any means apparent to one of ordinary skill the art. For instance, tap 140 may be threaded onto/into upper member 102 or tap 140 may have a threaded portion that extends through tap opening 130 and is retained in tap opening 130 by a nut positioned inside of upper member 102.

In several embodiments, upper member 102 also defines a vent opening 150. Vent opening 150 can be arranged so as to allow ventilation of pressurized gases, such as $CO_2$, that form within the cavity of upper member 102 during a fermentation process. In arrangements having a vent opening 150, a vent plug 154 arranged to nearly close vent opening 150 may be positioned in vent opening 150 so that vent opening 150 is nearly closed before, during, and/or after fermentation, leaving only a small passageway for pressure equalization. Alternatively, brewing assembly 100 may include and/or be provided with an airlock device, such as a double bubble airlock 156 (illustrated in FIG. 2) or a three-piece airlock, arranged to allow pressurized gas to escape from the cavity of upper member 102 and prevent air from outside of upper member 102 from entering the cavity. The airlock 156 contains water and is clear to allow its functioning to be observed. For example, a double bubble airlock 156 may be positioned in a stopper 158 positioned in vent opening 150, as shown in the exploded view of FIG. 2. In some arrangements, the airlock device is arranged to prevent "suck back", which is the movement of the liquid from the airlock device into the cavity of the upper member 102 due to a pressure and/or temperature change.

Other components suitable for sealing openings of upper member 102, such as top opening 120, tap opening 130, and/or vent opening 150 may be included in and/or with brewing assembly 100. For example, a stopper 158 (illustrated in FIG. 2) and/or gaskets arranged for positioning between upper member 102 and lid 122, tap 140, and/or vent plug 154 or another airlock device may be included.

Base member 104 of brewing assembly 100 comprises a contacting portion 170 arranged to contact lower portion 112 of upper member 102. In some embodiments, contacting portion 170 contacts both lower portion 112 and upper portion 110 of upper member 102. Preferably, contacting portion 170 is generally funnel shaped and is sized so that upper member 102 nests within the contacting portion 170. For example, in some instances, contacting portion 170 can have a circumferential surface that defines a substantially continuous and generally conical portion arranged to mate with a generally conical lower portion 112 of upper member 102.

In some arrangements, contacting portion 170 of base member 104 has an upper generally circular portion 172 with a generally cylindrical upper portion 174 and generally funnel shaped lower portion 176. Base member 104 is sized and configured so that upper member 102 can nest and/or mate with base member 104. For example, a lower portion of upper member 102 can nest with a lower part of its generally cylindrical upper portion 110 adjacent to generally cylindrical upper portion 174 of base member 104. Additionally, when upper member 102 is nested with base member 104, an upper part of generally conical lower portion 112 of upper member 102 is adjacent to generally funnel shaped lower portion 176 of base member 104.

In some instances, base member 104 comprises a plurality of legs 190 arranged to support contacting portion 170. In some instances, base member 104 of brewing assembly 100 comprises at least three legs 190 that are slidably received within corresponding openings 194 defined by contacting portion 170. Legs 190 can be made of plastic tubing and define an opening or aperture arranged to receive a leg plug 198 and end of leg 190, opposite the end connected to contacting portion 170. Preferably, leg plugs 198 are arranged so as to provide contact between each of legs 190 and the resting surface of brewing assembly 100 so that base member 104 sits level on a supporting surface and does not tip or teeter. Additionally, leg plugs 198 may deter sliding and/or limit the pressure of the contact area that touches the resting surface. Leg plugs 198 may be made of any material apparent to be suitable to one of ordinary skill in the art. Preferably, leg plugs 198 are made of an elastomer.

Other variations on the arrangement for coupling legs 190 to contacting portion 170 will be apparent to those of ordinary skill in the art. For example, instead of legs 190 being slidably received within openings 194 defined by contacting portion 170, contacting portion 170 may have stems arranged to extend into the ends of legs 190. Similarly, other arrangements of legs 190 are contemplated and will be apparent to those of ordinary skill in the art. For example, legs 190 may extend in non-parallel directions, may be coupled to one or more other legs, and/or may have various shapes and sizes.

As mentioned above, FIG. 2 illustrates an exploded view of one embodiment of a brewing assembly 100. Similar to the brewing assembly 100 illustrated in FIG. 1, brewing assembly 100 illustrated in FIG. 2 has an upper member 102 and a base member 104. In some instances, brewing assembly has a thermometer 220 positioned and/or positionable on an outer surface of upper member 102, for example, a liquid crystal, stick-on thermometer 220 capable of sensing the temperature of the outer surface of upper member 102 without penetrating the wall of upper member 102. Other types of thermometers are also contemplated. For example, thermometer 220 may comprise a bimetal component, a shape memory alloy, and/or an infrared detector, just to name a few non-limiting examples. Traditional thermometers that would extend through the wall of the upper member 102 are also contemplated.

Having a thermometer 220 capable of measuring the outer surface of upper member 102 is desirable in many instances as it can reduce the number of openings in upper member 102 and therefore reduce likelihood of fluid and/or gas leaking out of or into the cavity defined by upper member 102; which could lead to spoilage or contamination of the material being contained (e.g., fermented). Similarly, having fewer openings in upper member 102 can reduce the number of locations in which harmful bacteria may become positioned and potentially missed during a cleaning of brewing assembly 100. Therefore, having a thermometer than can measure the temperature of the outside wall of upper member 102 can be advantageous.

Preferably, upper member 102 and base member 104 are made of plastic, and, as will be appreciated those of ordinary skill the art, can be formed by injection molding and/or blow molding, just to name a few non-limiting examples. Desirably, generally cylindrical upper portion 174 and generally funnel shaped lower portion 176 of upper generally circular portion 172 comprise a unitary member that is injection molded. Similarly, generally cylindrical upper portion 110 and generally conical lower portion 112 of upper member 102 are preferably a unitary, blow-molded piece. Other portions of brewing assembly 100 may be made of plastic, such as lid 122, tap 140, double bubble airlock 156, and legs 190.

Figure 3:
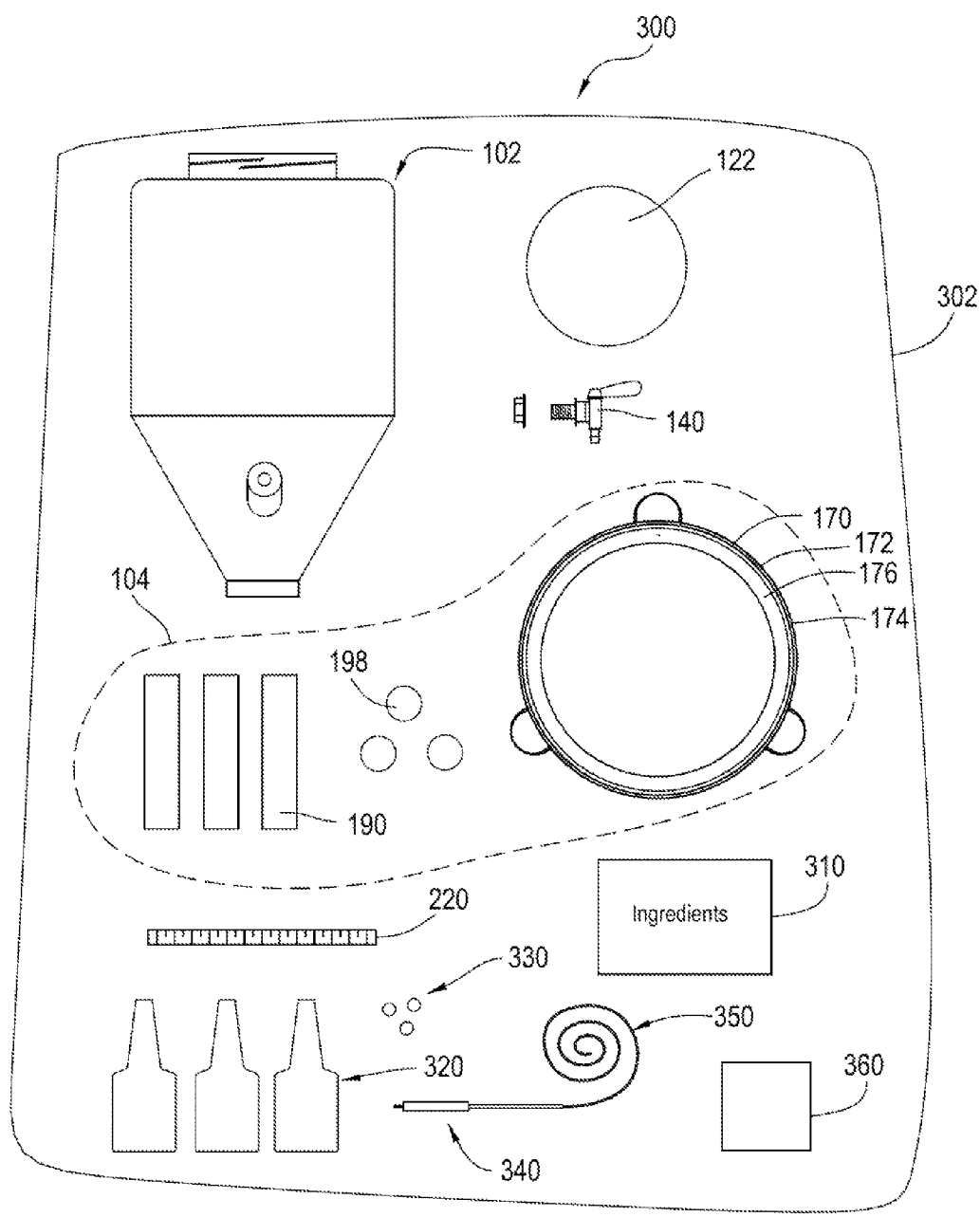
FIG. 3 is a plan view schematically illustrating a brewing kit that includes the parts to assemble the brewing assembly of FIG. 1, along with other items used in association with the brewing assembly, all within a kit package.

FIG. 3 schematically illustrates a plan view of one embodiment of a brewing kit. In this embodiment, brewing kit 300 comprises a container or package 302 containing an upper member 102, a base member 104, a lid 122, and a tap 140. As will be appreciated in view of the above described embodiments, base member 104 can comprise contacting portion 170, legs 190, and leg plugs 198. Brewing kit 300, in some instances, also includes a stick-on thermometer 220 positioned in package 302. Additionally, other items can be included in package 302 such as ingredients 310 for making a batch of beer, bottles 320, caps 330, a bottle filler 340, tubing 350, and/or other utensils or cookware 360, such as a pot for making mash or wort, or a double bubble airlock 156. For larger units, a trap valve, not shown, can be added to the bottom of the unit for easy removal of sediment.

While at least one embodiment has been illustrated and described in detail in the drawings and foregoing description, the same is to be considered as illustrative and not restrictive in character, it being understood that the preferred embodiment has been shown and described and that all changes, equivalents, and modifications that come within the spirit of the inventions defined by following claims are desired to be protected. It will be evident from the specification that aspects or features discussed in one context or embodiment will be applicable in other contexts or embodiments. All publications, patents, and patent applications cited in this specification are herein incorporated by reference as if each individual publication, patent, or patent application were specifically and individually indicated to be incorporated by reference and set forth in its entirety herein.

The invention claimed is:

1. A brewing assembly comprising:
   a) An upper member having a cylindrical upper portion with a top and a conical lower portion with a conical side and a bottom;
   b) A base member having an upper circular part with a cylindrical upper portion and a funnel-shaped lower portion sized so that said upper member can nest with
      1) the lower part of the cylindrical upper portion of said upper member adjacent the upper cylindrical part of said base member and
      2) the upper part of said conical lower portion of said upper member adjacent said funnel-shaped lower portion;
   c) A lid positioned to close the top of said upper member; and
   d) A tap in fluid communication with said conical lower portion of said upper member.

2. The brewing assembly of claim 1 in which said base member additionally comprises three legs.

3. The brewing assembly of claim 2 in which said base member is made of plastic having three openings into which said three legs are inserted.

4. The brewing assembly of claim 3 in which said three legs are made of plastic tubing and additionally have three leg plugs at their lower ends each inserted into the three legs, respectively.

5. The brewing assembly of claim 4 in which said base member is injection molded plastic and said upper and lower portions of said upper member is a unitary blow molded plastic piece.

6. The brewing assembly of claim 5 which additionally includes a stick-on thermometer placed directly on the outside of said upper member.

7. The brewing assembly of claim 1 additionally including an airlock or vent plug directly connecting to the upper member.

8. The brewing assembly of claim 4 in which said leg plugs are made of an elastomer.

9. The brewing assembly of claim 1 in which said upper member is free of any attachment mechanism other than gravity to hold it in place on said base member, and in which the upper member can be lifted from said base member with the tap remaining attached to said conical lower portion without using tools.

10. The brewing assembly of claim 9 in which a tap is at the bottom of said conical lower portion.

11. The brewing assembly of claim 9 in which said tap is positioned about half way down the side of said conical lower portion.

12. A brewing assembly, comprising:
an upper member having a cylindrical upper portion and a conical lower portion and defining a cavity for receiving a fluid, said cylindrical upper portion having a top opening, and said conical lower portion having a port arranged to connect to a tap;
a base member having a substantially continuous and conical portion arranged to mate with said conical lower portion of said upper member;
a lid arranged to close said top opening of said upper member; and
a tap in fluid communication with said port.

13. The brewing assembly of claim 12, further comprising:
a plurality of legs, wherein said base member defines openings sized and arranged to slidably receive said plurality of legs.

14. A brewing assembly comprising:
a) an upper member having a cylindrical upper portion with a top and a conical lower portion with a conical side and a bottom;
b) three legs each having a long dimension;
c) a plastic base member having a funnel-shaped portion sized so that said upper member can nest with the upper part of said conical lower portion of said upper member adjacent said funnel-shaped lower portion, with said base member also having three openings into which said three legs are inserted in the direction of said long dimension; and
d) a lid positioned to close the top of said upper member.

15. The brewing assembly of claim 14 in which said base member is injection molded plastic and said upper and lower portions of said upper member is a unitary blow molded plastic piece.

\* \* \* \* \*